(12) United States Patent
Albertelli

(10) Patent No.: US 7,304,663 B2
(45) Date of Patent: Dec. 4, 2007

(54) IMAGE TEST TARGET FOR VISUAL DETERMINATION OF DIGITAL IMAGE RESOLUTION

(75) Inventor: Lawrence E. Albertelli, Owego, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 124 days.

(21) Appl. No.: 11/196,242

(22) Filed: Aug. 4, 2005

(65) Prior Publication Data

US 2005/0275724 A1 Dec. 15, 2005

Related U.S. Application Data

(63) Continuation of application No. 09/695,873, filed on Oct. 26, 2000, now Pat. No. 6,992,696.

(51) Int. Cl.
 *H04N 17/00* (2006.01)
(52) U.S. Cl. ..................................................... 348/188
(58) Field of Classification Search ................ 348/188, 348/189, 187, 185, 180–181, 190–191
 See application file for complete search history.

(56) References Cited

U.S. PATENT DOCUMENTS

| | | | | |
|---|---|---|---|---|
| 3,853,403 A | * | 12/1974 | Bentley | .................. 356/71 |
| 4,386,849 A | | 6/1983 | Haeusler et al. | ............ 356/124 |
| 4,414,573 A | | 11/1983 | Griesshaber et al. | |
| 4,513,318 A | | 4/1985 | Wilensky et al. | |
| 4,575,124 A | | 3/1986 | Morrison | |
| 4,628,342 A | | 12/1986 | Desmons et al. | |
| 4,760,447 A | | 7/1988 | Koka et al. | |
| 4,761,685 A | * | 8/1988 | Asaida et al. | ............... 348/188 |
| 4,951,141 A | | 8/1990 | Fischer | |
| 4,991,007 A | | 2/1991 | Corley | |
| 5,140,418 A | | 8/1992 | Rivamonte | |
| 5,327,226 A | | 7/1994 | Tanabe | |
| 5,351,201 A | * | 9/1994 | Harshbarger et al. | ........ 348/187 |
| 5,454,048 A | | 9/1995 | Davis | ........................ 382/281 |
| 5,508,803 A | * | 4/1996 | Hibbs et al. | ............. 356/243.5 |
| 5,732,163 A | | 3/1998 | Brandstetter et al. | ....... 382/296 |
| 5,760,829 A | * | 6/1998 | Sussmeier | ................... 348/187 |
| 5,818,520 A | | 10/1998 | Janko et al. | |
| 5,820,547 A | | 10/1998 | Strobl et al. | ................ 600/127 |
| 5,917,987 A | * | 6/1999 | Neyman | ...................... 386/42 |
| 6,075,893 A | | 6/2000 | Brandstetter et al. | ....... 382/199 |
| 6,088,105 A | | 7/2000 | Link | |
| 6,222,934 B1 | | 4/2001 | Tsai | ........................... 382/112 |
| 6,275,621 B1 | | 8/2001 | Terry | .......................... 382/289 |
| 6,356,298 B1 | | 3/2002 | Abe et al. | |
| 6,509,559 B1 | * | 1/2003 | Ulrich et al. | ........... 250/237 G |
| 6,992,696 B1 | * | 1/2006 | Albertelli | .................... 348/188 |

* cited by examiner

*Primary Examiner*—Paulos M. Natnael
(74) *Attorney, Agent, or Firm*—Whitham, Curtis, Christofferson & Cook, PC

(57) ABSTRACT

Resolution of an image capture system is measured by imaging a test target having a progression of feature sizes and pitch in respective sub-fields thereof. The image captured by the imaging system is then inspected to determine a sub-field image which does not include aliasing in the form of a Moire' pattern. Inclusion of reference numerals corresponding to the sub-field image feature size and pitch allows direct reading of the resolution of the imaging system. Such a system enables fast and accurate determination of the resolution and alignment of an imaging system using an inexpensively produced test target together with an arbitrary image viewing program.

8 Claims, 4 Drawing Sheets

IMAGE TEST TARGET FOR VISUAL DETERMINATION OF DIGITAL IMAGE RESOLUTION

CROSS-REFERENCE TO RELATED APPLICATIONS

This application is a continuation of U.S. patent application Ser. No. 09/695,873, filed Oct. 26, 2000, now U.S. Pat. No. 6,992,696 and assigned to the Assignee of the present application, which is hereby fully incorporated by reference and priority of which under 35 U.S.C. § 120 is hereby claimed.

BACKGROUND OF THE INVENTION

1. Field of the Invention

The present invention generally relates to digital imaging and, more particularly, to optical evaluation and resolution measurement of digital imaging cameras, especially digital cameras useful for applications such as machine vision, character or feature recognition, bar code reading and automated inspection systems.

2. Description of the Prior Art

The capture of images on various light sensitive media has been known and widely practiced for over one hundred fifty years. During the last fifty years, optical sensors have been developed to generate electrical signals directly from the illumination pattern incident on the sensor. Even more recently, there has been considerable interest in developing signals which can be directly operated upon by digital data processing equipment for various applications such as optical inspection in manufacturing processes and automatic control systems. Automatic control systems such as vehicle guidance often rely on detection, identification and tracking of visual targets which must be accomplished with extremely high reliability, particularly when concerns for public safety, operation of costly apparatus and the like are presented. Such reliability is often limited by optical performance of image capture apparatus.

Visual targets may be of any form which can be extracted from the remainder of an image within the required response time with the data processing capacity which is practical to provide. The image from which the target must be extracted may vary widely in content and lighting conditions. That is, the natural features (or "background clutter") of the image may not be easily controllable and the appearance of those features in an image may vary widely with lighting conditions while the features of a visual target must be extracted therefrom at high speed with limited processing. For that reason, visual targets which have features presenting particularly high contrast of relatively simple geometric form such as concentric circles are much preferred at the present state of the art. When such features are used, the critical parameter of optical system performance for target detection, identification and tracking is image resolution.

Unfortunately, optical resolution is often particularly difficult and expensive to quantitatively evaluate, particularly when derived from sensors having discrete areas corresponding to individual pixels, such as are provided by charge coupled devices which are currently preferred for image capture in most applications. In such devices, the individual pixel areas may be extremely small but each pixel area is, of course, finite and the response to radiation (e.g. light) imaged upon each pixel area is effectively averaged over that individual area. Thus, the sensor, itself, imposes a limit on resolution and complicates measurement of resolution of the optical image capture system as a whole.

At the same time, available image resolution is critical to the design of the visual targets to be employed. That is, the contrasting features of a target must be of sufficient size to be unambiguously discriminated at distances appropriate to other constraints of the application and within the resolution of the image capture system such as reasonable distance over which control is to be exercised in a vehicle guidance system, the potential variation in distance of an object having features or characters to be read or the transverse dimensions of contrasting features to be detected and processed at a distance which may or may not be well-regulated. Therefore, accurate and readily available knowledge of resolution of an image capture system is essential to efficient design of reliable systems for each of an extremely wide variety of applications. Further, it is useful and important to be able to rapidly test individual image capture devices or cameras when the device is placed in service to ascertain that it can perform as intended.

SUMMARY OF THE INVENTION

It is therefore an object of the present invention to provide a technique by which resolution of an optical system can be readily determined by inspection of a single image formed therewith.

It is another object of the invention to provide an imaging target which can be easily fabricated at very low cost.

It is a further object of the invention to provide a method of determining at least resolution and alignment of an imaging system with apparatus limited to a target pattern.

In order to accomplish these and other objects of the invention, a method of measuring resolution of an imaging system is provided comprising steps of imaging a target including a plurality of sub-fields having a progression of image feature size and pitch encompassing the resolution of the imaging system to produce a captured image, inspecting the captured image for presence or absence of Moire' patterns in sub-fields of the captured image, and determining resolution of the imaging system from feature size and pitch in sub-fields.

In accordance with another aspect of the invention, a target for determining resolution of an imaging system is provided including a plurality of sub-fields, each subfield including a plurality of features, the plurality of subfields having a progression of image feature size and pitch encompassing the resolution of said imaging system, referred to an object plane of the imaging system.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
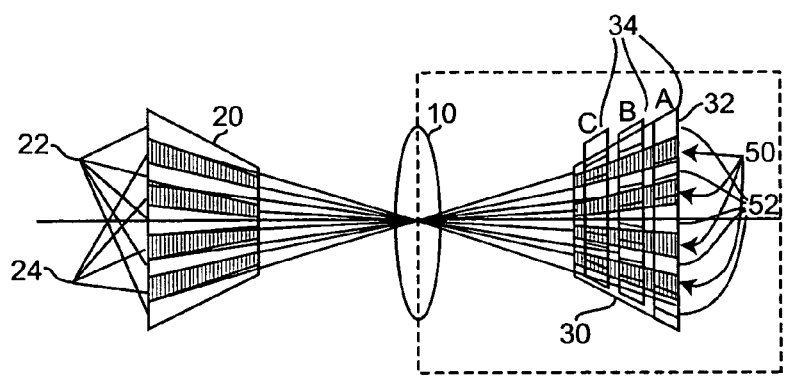
FIG. 1 is a top or side perspective view of a simplified optical system including a sensor and a test target in accordance with the invention.

Referring now to the drawings, and more particularly to FIG. 1, there is shown an optical system collectively depicted as lens 10, imaging high contrast features 22, 24 of test target 20 onto a sensor comprising an array of pixel area sensors 32. A practical sensor array 30 might include a matrix of several hundred to several thousand sensors on a side (e.g. a 1000 by 1000 array containing one million pixels) or such an array may be simulated by a linear array, referred to as a line scan sensor, as is generally the case and depicted as any one of arrays a, b, or C. It is assumed for purposes of this discussion that the image of the test target 20 is brought to good focus on the image plane of the sensor array 30. The relative position of the test image or target 20 is not particularly important to an understanding of the invention since, at any distance of the test pattern or target 20 from the camera 40, each feature 22, 24 of test pattern 20 will subtend a particular spatial angle relative to the camera 40 and image plane 30. It is sufficient to an understanding of the invention that distances along the image plane will generally be proportional to distances such as feature width and spacing along the plane of the test target at least over a fraction of the respective areas (more or less corresponding to a sub-field as will be described below) and that levels of distortion expected from commercially available lenses are generally well below levels which could compromise successful practice of the invention.

The maximum resolution of the image capture apparatus/ camera 40 will be determined in accordance with the invention where resolution is limited by the division of the pixel array 30 or the pitch of pixels 32. This condition will be reached when the transverse dimension of test image features 50, 52 equals the pitch of pixels 32 in sensor array 30. In the particular preferred test image illustrated, it will be understood that this condition will be met when each of features 50, 52, which are preferably of equal width (or subtend equal angles from the center of the lens system) overlies or is the same width as a single pixel.

However, for purposes of discussion and explanation of the operation of the invention, the imaged features 20, 24 of the test pattern 20 are illustrated as each overlying slightly more than one pixel in FIG. 1. Three pixel rows/columns 34 are indicated by brackets A, B and C in FIG. 1 in varying positions (but equal pitch slightly differing from the target feature pitch referred to the image plane) for purposes of illustration. Consecutive pixels in a row/column 34 of sensor array 30 are shown with their corresponding pixel outputs in FIGS. 2A, 2B and 2C, respectively.

It should be appreciated that each of the output signals shown for the respective pixels of the respective overlapping groups is proportional to the area illuminated (or not) by the respective features 50, 52 and, since the width of these features when projected onto the image sensor array 30 is greater than the pixel dimension, will represent a particular gray-scale value, max. white, or min. black. Conversely, if the feature width is less than the dimensions of a pixel, zero and maximum values of the output signal will not be obtained with adjacent pixel outputs having an intermediate gray-scale value.

Figure 2A:
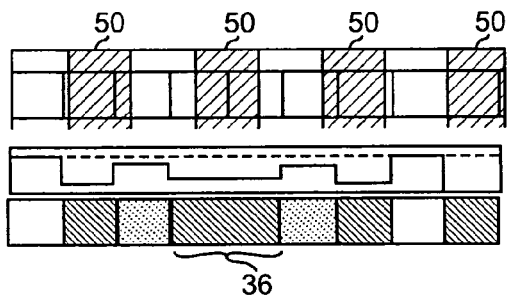
FIGS. 2A, 2B and 2C are plan views of a test image falling on a sensor array as depicted variously in FIG. 1 and including a graphical depiction of pixel outputs.
Figure 2B:
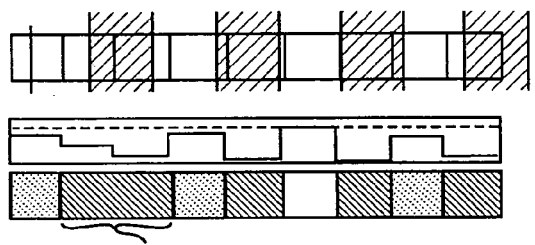
Figure 2C:
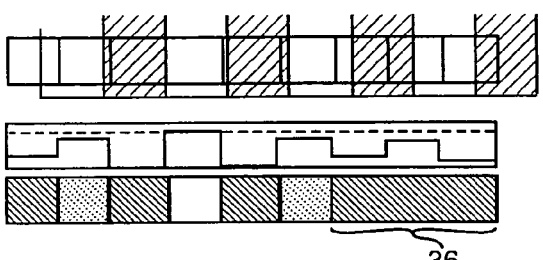

Accordingly, by comparing the illumination patterns from the target features projected on a sensor array, as illustrated in FIGS. 2A, 2B and 2C, it can be seen that target feature will be incident on varying fractions of adjacent pixels but that the location of pairs of adjacent pixels more or less equally illuminated (or not) will vary in position depending on the location of the array and the target perpendicular to the optical system axis. In other words, if the pitch of target features, referred to the image plane, differs from the pixel pitch, Moire' patterns including relatively wide features (e.g. 36) will unconditionally result from "beating" of the different spatial frequencies of the target features and pixels.

Figure 2D:
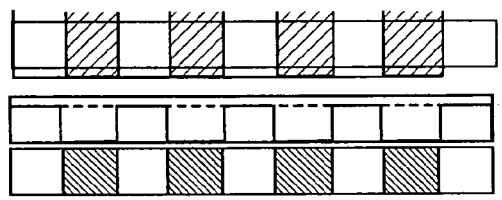
FIGS. 2D, 2E and 2F are plan views of best, worst and intermediate case imaging of the test image at best resolution and including a graphical depiction of pixel outputs.
Figure 2E:
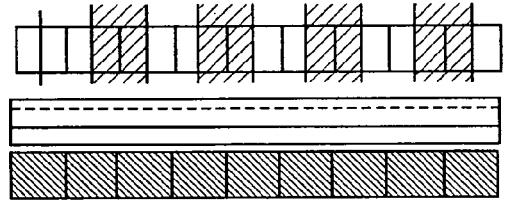
Figure 2F:
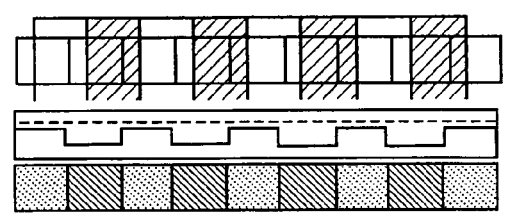

If, on the other hand, the imaged target features are the same size as the size of a pixel referred to the image plane Moire' patterns will not be produced and the received image or sensor output pattern will assume one of the forms illustrated in FIGS. 2D, 2E or 2F. It is only when the feature width is the same as the pixel width and the test image features aligned so as to be accurately projected exactly onto pixels within the rows that no gray-scale output values will result. This best-case condition is shown in FIG. 2D wherein the illuminated range 50 exactly overlays a pixel 32 of the sensor array 30 and the output is either a minimum or a maximum with no gray scale fringes.

The worst case for identical feature size is shown in FIG. 2E where illuminated regions 50 are equally divided between adjacent pixels and the output is a uniform gray level. This condition is extremely rare although theoretically equally likely as that of FIG. 2D. This in no way compromises the determination of resolution since adjacent targets having even very slight differences of target feature and pixel pitches will have Moire' fringes. If the illuminated regions 50 are shifted from the condition illustrated in FIG. 2F, different gray scale levels (contrast) will be output from adjacent pixels with difference increasing with shift until the condition of FIG. 2D is reached with no Moire' fringes being developed at any degree of shift.

Therefore, it is only when the features 50, 52 projected on sensor array 30 have the same pitch as the pixels 32 that the outputs of the alternating pixels will have similar values. Conversely, at other, differing relative pitches of target features and pixels, the respective pixels outputs will vary non-periodically as shown in FIGS. 2A-2C and will result in aliasing in the form of a Moire' pattern having coarse vertical grey scale bands. (Rotational misalignment of the pixel rows of the sensor with features of the test image will cause an apparent increase in best resolution or cause the vertical bands of the Moire' pattern to be angled when the feature pitch does not match the pixel pitch. Therefore, the invention is also capable of testing for alignment of the image capture device 40, as well.) The pitch of the Moire' bands will decrease as the imaged feature pitch approaches pixel pitch and maximum resolution and Moire' bands will abruptly disappear altogether where the feature dimensions and pitch, as imaged, match that of the pixels 32.

Contrast may be reduced depending on relative position of target features when target feature and pixel pitches are matched but the contrast of the Moire' bands will not be affected. The contrast of the pattern will also be reduced as the feature dimensions become much smaller than the pixel but this effect is not important to the invention since it is used at or near actual image resolution. Contrast will also be reduced as the resolution limits of the optical system is approached.

Figure 3:
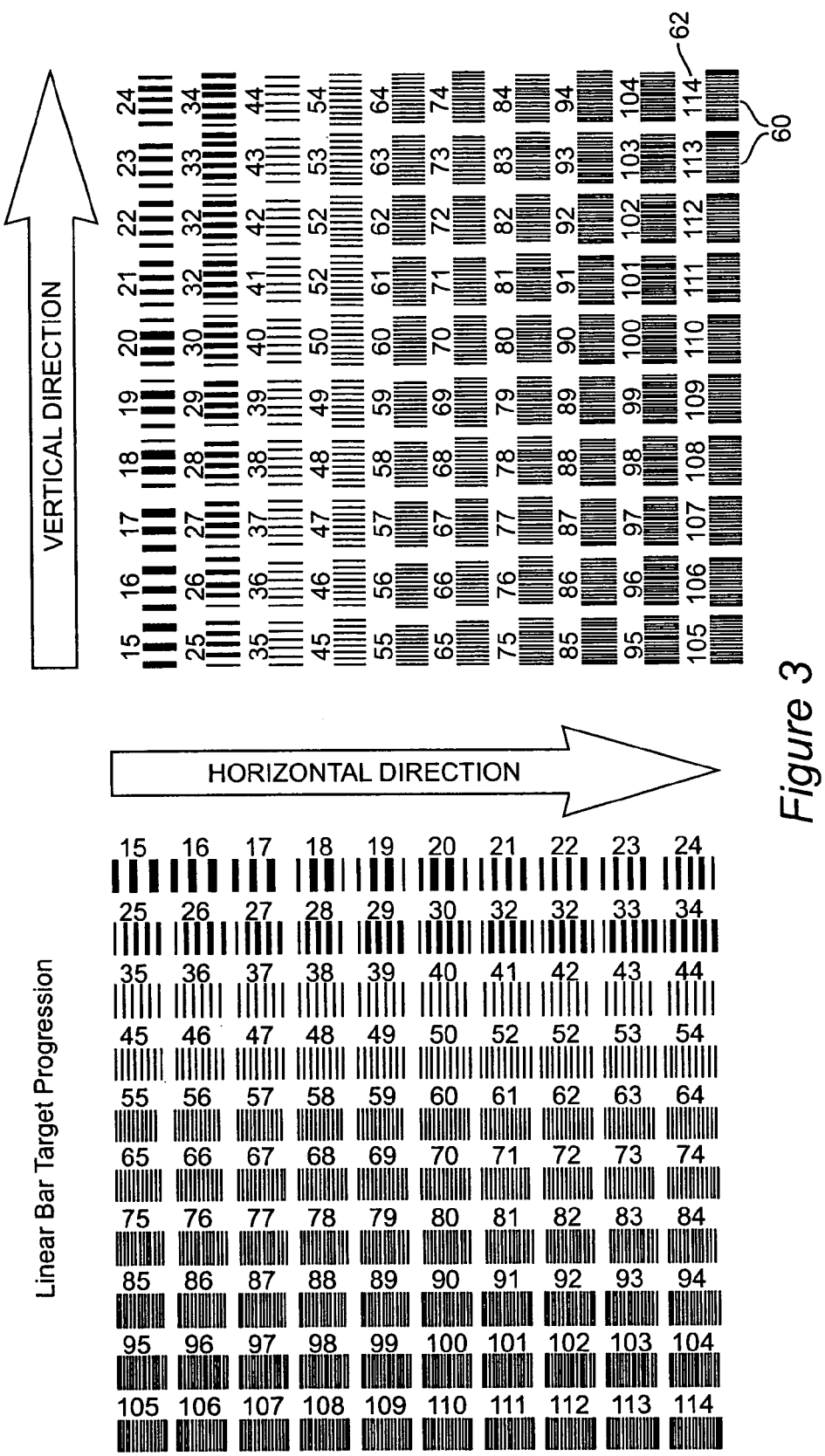
FIG. 3 is a portion of an exemplary test image in accordance with the invention.

This effect is exploited in accordance with the present invention by imaging a plurality of sub-fields 60 providing a progression of different feature pitches and dimensions encompassing the resolution of the imaging system or camera 40, as shown in FIG. 3. Human readable reference numbers 62 are preferably included which correspond to feature size and/or pitch of features in each subfield and reflect the number of features or dots per inch (or any other convenient unit) referred to the object plane. (The resolution at the image plane is fixed by sensor size and pitch. Resolution at the object plane is determined by object distance and, hence, magnification.) Additional images may be included in the target such as for indicating the direction of progression of feature size or pitch.

Figure 4:
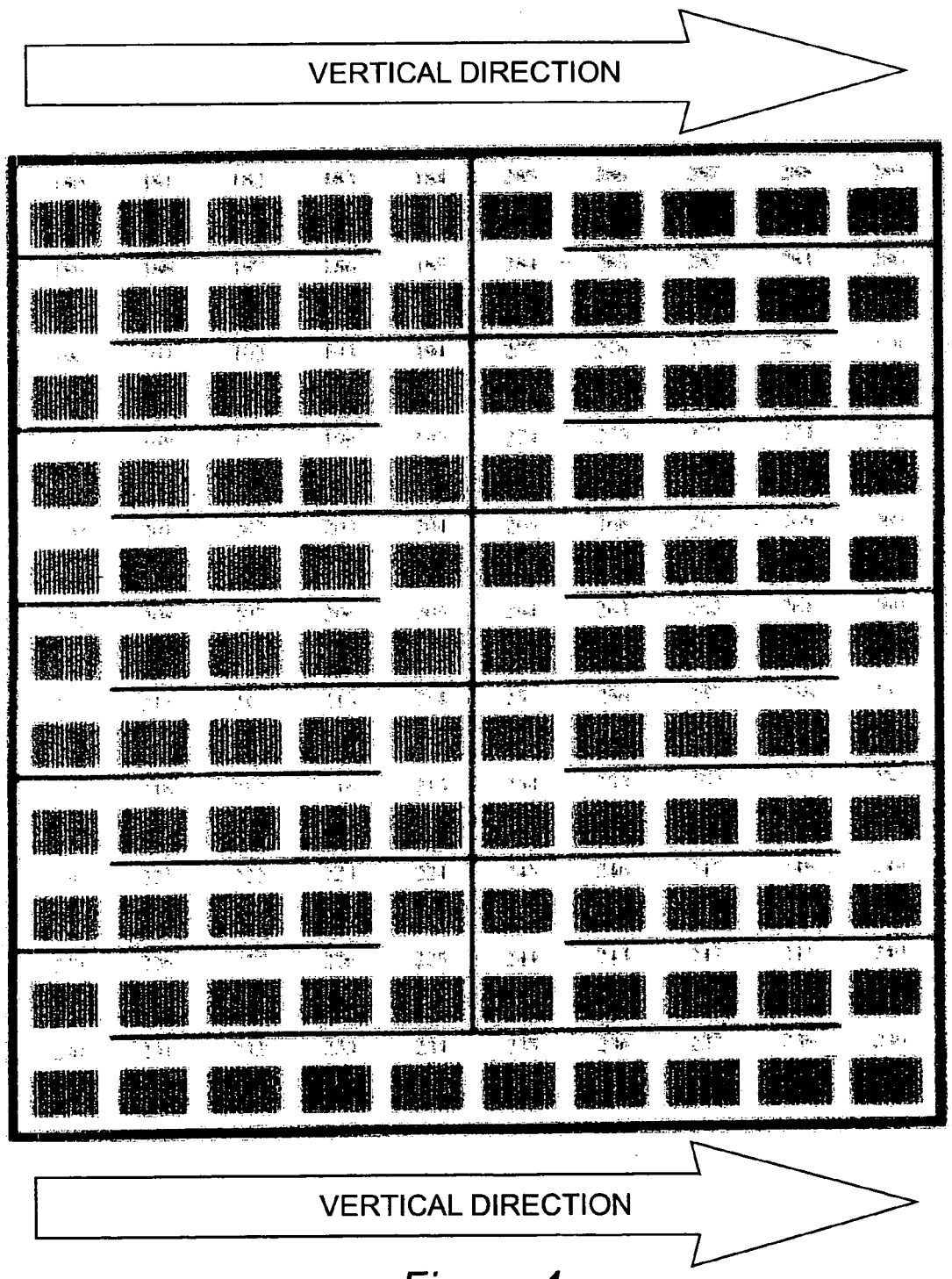
FIG. 4 is an image produced in accordance with the invention from which resolution of the image capture system may be determined by inspection.

The image produced by the image capture device or camera 40 is shown in FIG. 4 (although the image of FIG. 4 would correspond to an extension of the sub-fields of FIG. 3 to finer feature dimensions and pitches). Where the feature dimensions do not exactly correspond to the resolution-limiting pixel pitch, Moire' pattern bands or fringes are evident. These appear as relatively narrow gray bands at substantial differences (e.g. at around 180 and 220) of pitch from system resolution which increase in width and separation as actual system resolution (187) is approached.

Figure 5:
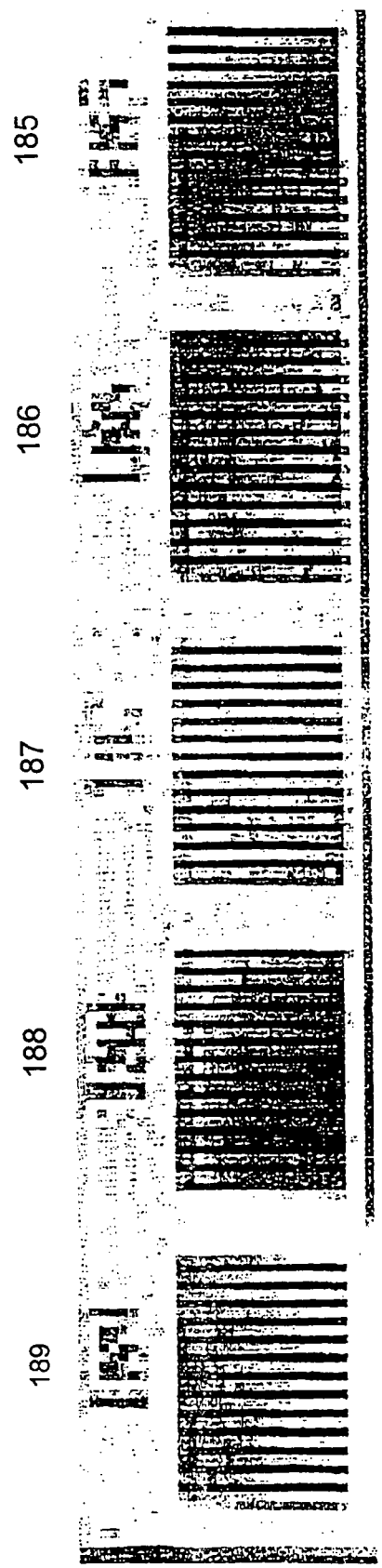
FIG. 5 is an enlarged view of the region of interest in FIG. 4.

In the particular case illustrated in FIG. 4 and in enlarged form in FIG. 5, the actual resolution may be readily determined from inspection to be 187 lines or dots per inch. This sub-field shows no evident Moire' pattern and is framed (at 186 and 188) by sub-fields having substantial gray areas of substantially uniform tone caused by gradually changing overlap of image features with pixel rows or columns producing the Moire' pattern. It should be noted, particularly in FIG. 5, that single, large Moire' fringes appear in all but the center subimage. In this manner, by choosing the subimage with the least amount of fringing, the best resolution can be readily determined by inspection even in the worst case as depicted in FIG. 2E where the entire subimage is the same gray level. In other words, the Moire' pattern as produced in accordance with the invention may be considered as a beating of different spatial frequencies with the frequency of the beating diminishing with diminishing difference of spatial frequency.

In this case, also, the test pattern is well-imaged at maximum resolution, indicating an alignment probably between the best case of FIG. 2D and the intermediate case of FIG. 2F. With slightly different alignment, sub-field 187 could be imaged as a substantially uniform gray while sub-fields 186 and 188 would appear substantially the same but with the broad gray scale areas in the form of low frequency Moire' fringes present.

In short, imaging such a pattern will result in an image from which actual system resolution can be determined with extremely high accuracy (e.g. within less than two lines or dots per inch or one percent or better in this case) upon quick visual inspection of the image. Thus, this effect referred to the design of a suitable visual target in regard to an image capture device or camera verifies the ability for the camera having resolution measured in accordance with the invention to produce an image from which a target having corresponding angular feature sizes can be detected, identified and tracked with minimal processing.

It should also be recognized that the technique in accordance with the invention is extremely inexpensive since the test patterns such as that shown in FIG. 3 are the only equipment required other than the camera and imaging system itself, to which the invention is applied. These patterns can be readily generated and printed by computer and commercially available computer printers since they may be much larger than the image as projected on the sensor array 30 and resolution of six hundred dots per inch (at the larger size) is available from many laser printers of current design. High contrast of the test target may be enhanced by photographic transfer processes available at most commercial print shops.

While the invention has been described in terms of a single preferred embodiment, those skilled in the art will recognize that the invention can be practiced with modification within the spirit and scope of the appended claims.

Having thus described my invention, what I claim as new and desire to secure by Letters Patent is as follows:

1. A target for determining resolution of an imaging system by inspecting an image of said target for Moire' fringes in respective sub-fields of an image of said target, said target including
   a plurality of sub-fields, respective sub-fields including a plurality of features, said plurality of features of respective sub-fields of said plurality of sub-fields having a progression of image feature size and pitch encompassing and approaching the spatial resolution of said imaging system, referred to an object plane of said imaging system, and
   indicia indicating a resolution corresponding to feature size of features in a sub-field.

2. A target as recited in claim 1, wherein said features include lines and spaces.

3. A target as recited in claim 1, further including indicia indicating a resolution corresponding to pitch of features in a sub-field.

4. A target as recited in claim 1, wherein said indicia is a human readable number.

5. A target as recited in claim 3, wherein said indicia is a human readable number.

6. A target as recited in claim 1, including reference numbers corresponding to resolution of said imaging system and a further indicia.

7. A target for determining spatial resolution of an imaging system by inspecting an image of said target for Moire' fringes in respective sub-fields of an image of said target, said target including
   a plurality of sub-fields, respective individual sub-fields including a plurality of features, said plurality of features of each respective sub-field of said plurality of sub-fields having features such that sizes and pitches of features of respective sub-fields of said plurality of sub-fields provide a progression of image feature size and pitch encompassing the spatial resolution of said imaging system by including feature sizes and pitches above and equal to, below and above, or below and equal to said spatial resolution of said imaging system, referred to an object plane of said imaging system, in different respective sub-fields of said target.

8. A target for determining spatial resolution of an imaging system by inspecting an image of said target for Moire' fringes in respective sub-fields of an image of said target, said target including
   a plurality of sub-fields, respective individual sub-fields including a plurality of features, said plurality of features of each respective sub-field of said plurality of sub-fields having features such that sizes and pitches of features of respective sub-fields of said plurality of sub-fields provide a progression of image feature size and pitch encompassing the spatial resolution of said imaging system by including feature sizes and pitches above and equal to, below and above, or below and equal to said spatial resolution of said imaging system, referred to an object plane of said imaging system, in different respective sub-fields of said target such that said Moire' fringes will be produced in respective sub-fields of an image of said target made by said imaging system; wherein said Moire' fringes will be minimized for a sub-field of said plurality of sub-fields in which feature size and pitch equals or most nearly approximates said spatial resolution of said imaging system.

* * * * *